Figure 1:
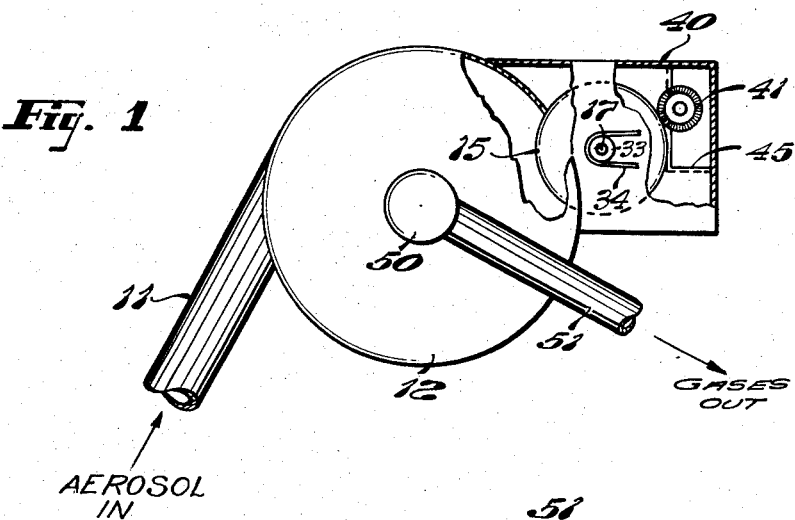

Feb. 24, 1959  J. Y. ROGERS, JR  2,874,839

GRIT SEPARATOR

Filed Aug. 15, 1955

AEROSOL IN

GASES OUT

SOLIDS OUT

MAGNETIC MATERIAL OUT

INVENTOR.
Joe Young Rogers, Jr.
BY
Kenway, Jenney, Witter & Hildreth
Att'ys.

United States Patent Office 2,874,839
Patented Feb. 24, 1959

2,874,839

GRIT SEPARATOR

Joe Young Rogers, Jr., Pampa, Tex., assignor to Godfrey L. Cabot, Inc., Boston, Mass., a corporation of Massachusetts Application August 15, 1955, Serial No. 528,421

9 Claims. (Cl. 209—232)

My invention relates to devices for separating magnetic materials from a mixture containing both magnetic materials and non-magnetic materials.

More particularly, my invention in one embodiment is concerned with removal of magnetic grit from a mixture containing both carbon black and the magnetic grit.

Still more particularly, my invention relates to a device capable of taking advantage of both magnetic and mechanical forces in order to achieve the separation of magnetic grit from the non-magnetic carbon black which it contaminates.

In the production of carbon black for purposes such as rubber manufacture, the smoke and other effluent gases from a furnace are often processed in such a way to separate the solid carbon particles, which are desired, from the gaseous products, which are undesired, at least for this particular purpose. Such separation may be obtained, at least to a degree, by mechanical forces in a device known as a "cyclone." In a typical cyclone device, the smoke and other effluent gases from the furnace are introduced at a rather high velocity into a chamber having a generally cylindrical shape and a vertical axis but having a substantially conical lower section to act as a hopper for the collection of carbon particles. Inasmuch as the direction of introduction of the smoke and effluent gases into the chamber is tangential to the cylindrical portion of the chamber the inertia of the carbon particles, which is greater than that of the effluent gases, tends to force the carbon particles against the wall of the chamber where friction slows them down and separates them from the gases. Thus the cyclone provides a satisfactory means for separating the solid materials from the gaseous materials in the smoke. However, there is a further problem which the cyclone alone seems incapable of handling. That problem is the presence in the smoke of grit, particularly metallic particles, which were picked up by the smoke in passage through the furnace. Such particles may have been derived from the scale on metallic flues of the furnace or may have been derived from foreign substances in the fuel burned. At any rate, such metallic particles are very undesirable in carbon black to be employed, for instance, in the manufacture of rubber. Therefore, some means must be employed for removing such metallic grit from carbon black in order to render the carbon black suitable for its intended uses.

In the past, manufacturers of carbon black have depended upon one or more cyclone stages to separate the solid materials from the gases in smoke and other combustion products but have then found it necessary in some later stage of the manufacturing process to remove the metallic grit in order to produce carbon black of satisfactory purity. Such a procedure lengthens and complicates the manufacturing process and does not take full advantage of the centrifugal action that occurs in the cyclone.

Accordingly, it is an object of my invention to provide a device capable not only of separating the solids from the gases in smoke and other combustion products but also of separating the metallic particles from the other solids in the same stage of the manufacturing operation.

It is a further object to provide a device capable of performing the separation of the solids from the gases and of the metallic solids from the non-metallic solids without unnecessary waste of power and without unnecessary complication of apparatus.

It is a still further object of my invention to take full advantage of the centrifugal action in a cyclone separator which tends to force metallic particles toward the wall of the chamber but which, without some further means, would not achieve actual separation of the metallic particles from the non-metallic particles.

It is a more general object of my invention to provide a device capable of separating particles of substantially any magnetic material from a mass containing particles of nonmagnetic material as well as particles of magnetic material whether or not those materials were before separation suspended in a gaseous medium.

Figure 2:
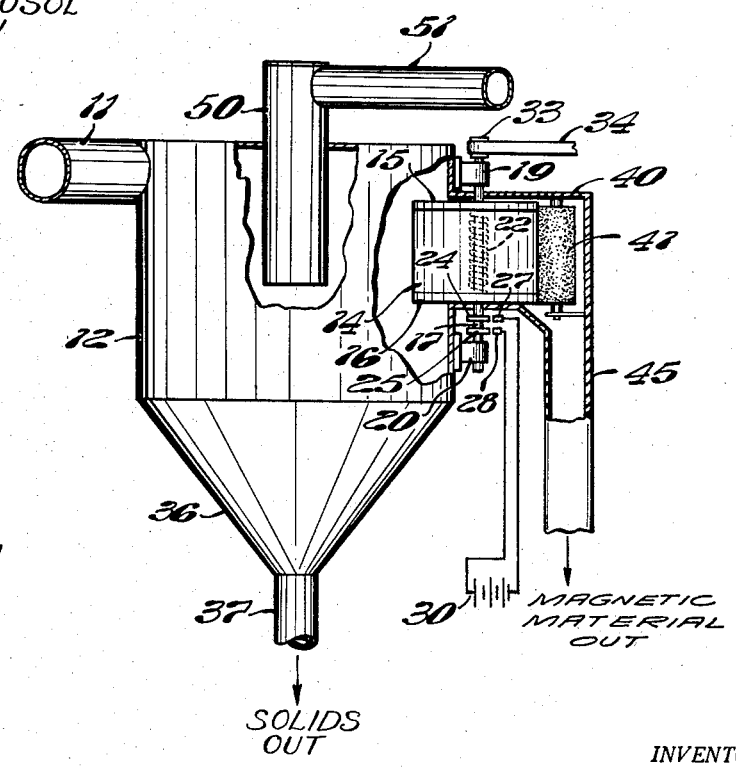

Other objects and advantages of my invention will become apparent after consideration of the following detailed specification taken in conjunction with the accompanying drawing in which:

Fig. 1 is a plan view of a device according to my invention, with part of the chamber wall cut away to expose the moving parts; and Fig. 2 is a front elevation view of a device according to my invention, again with part of the chamber wall cut away to expose important portions of the interior mechanism.

It will be understood that the following specification describes a favored embodiment of my invention. However, I do not intend to be limited to the details of the embodiment as set forth in the following specification, and I present at the end of the specification a series of claims which are to serve to define the scope of the invention.

Turning to Fig. 1 of the drawings, it will be seen that combustion products from a furnace are led through on inlet pipe 11 into a substantially cylindrical cyclone chamber represented generally by the numeral 12 and hereinafter referred to in broad terms as a hopper. Fig. 1 shows that, in the chosen embodiment, the combustion products enter chamber 12 tangentially in a position to be deflected in a clockwise direction by the chamber. The direction of deflection is, of course, unimportant, but for maximum effectiveness of separation, the combustion products should, as shown in Fig. 2, enter chamber 12 near the top thereof. Such a point of entry is desirable in order that the heavier solid materials in the combustion products, and particularly the magnetic materials, may fall slightly within the cylinder under the influence of gravity and may tend to strike a member 14, which may take the form of a drum mounted in the side wall of chamber 12. The drum 14 may comprise a cylindrical steel shell having circular end plates 15 and 16 respectively, and mounted rigidly on a shaft 17 which is capable of rotation. Shaft 17 may be supported near its respective ends by bearings 19 and 20 as best seen in Figure 2, those bearings being in turn supported on the side wall of chamber 12. It will be seen that member 14 projects somewhat into chamber 12 and that its end plates 15 and 16 are close to the walls of chamber 12 in order to minimize the leakage between the chamber walls and the ends of member 14. Likewise, the vertical portion of member 14 fits the side walls of chamber 12 rather closely, but some space should be left on at least one side of member 14 to permit magnetic material which has adhered thereto to pass out of chamber 12 on the surface of member 14 as it rotates.

Brief allusion has been made to the fact that magnetic material may adhere to the surface of member 14 and to the fact that member 14 rotates. It will now be explained why such adhesion takes place and how rotation of member 14 may be obtained. One effective way to get the magnetic material in combustion products to adhere to the outer surface of member 14 is to make member 14 part of a high-reluctance magnetic circuit so that considerable fringing flux is obtained between end plates 15 and 16 and within chamber 12. Such a flux pattern may be obtained by employing a magnetic material such as steel for both the shaft 17 and the member 14, and by surrounding shaft 17 with a suitably supported electromagnetic coil 22 having a current flowing through it. Thus, the magnetomotive force generated in the coil produces a flux through shaft 17, through end plates 15 and 16, and through the vertical cylindrical portion of member 14. By employing thinner steel stock for the vertical cylindrical portion of member 14 than for end plates 15 and 16, a considerable amount of the magnetic flux is forced to take a fringing path from plate 15 to plate 16 rather than passing through the vertical cylindrical portion. It is this fringing flux bridging from plate 15 to plate 16 through the interior of chamber 12 which causes the loose magnetic materials therein to migrate to the surface of the vertical cylindrical portion of member 14, where those materials can subsequently be collected. The migration of the magnetic materials can, of course, be attributed to the well known tendency of flux-carrying materials to tend to consolidate themselves into a magnetic circuit of the lowest possible over-all reluctance. In this case, magnetic materials adhering to the vertical cylindrical portion of member 14 lower the reluctance of the magnetic circuit by increasing the effective cross section of that vertical cylindrical portion. By virtue of the disparity in gauge of the material used in the vertical cylindrical portion as compared with that of the end plates, there is a greater tendency for the loose magnetic materials to adhere to the vertical portion, which is shunted by considerable fringing flux, than to adhere to the end plates, which are not flux-shunted to such a degree.

It has been stated that, in this chosen embodiment of my invention an electromagnetic coil 22 having a current flowing therein is employed for setting up the magnetic flux which courses through shaft 17, end plates 15 and 16, and the vertical cylindrical portion of member 14, and which also fringes to some degree into the air between plates 15 and 16. The current which energizes coil 22 may be introduced in any desired way such as, for instance, attaching a pair of slip rings 24 and 25 to shaft 17, by insulating at least one of those slip rings from the shaft, and by providing conductive paths from the respective slip rings to the ends of magnetic coil 22. Again, at least one of those conductive paths should be electrically insulated from shaft 17 in order that a potential difference may be established across the coil to cause current to flow therein. Slip rings 24 and 25 may be connected to a source of potential by means of a pair of brushes 27 and 28 which respectively bear against them, the brushes in turn being conductively connected across a source of potential schematically represented by the battery 30 but which in practice would be likely to be a D.-C. generator or a rectifier set.

Further mechanical details of the rotating system of member 14 require very little additional discussion for an understanding thereof. Clearly, end plates 15 and 16 should be firmly attached to shaft 17 both for mechanical strength and for prevention of excessive magnetic flux leakage at the points of attachment; steel flanges bolted to the end plates and pinned to shaft 17 would be suitable for this purpose. Either bearing 19 or bearing 20 or both should be capable of supplying some degree of axial thrust along shaft 17 in order to support member 17 and to prevent end plate 16 from scraping on the portion of the chamber tank adjacent it. Rotation of member 14 may be produced in any desired way, such as by driving a pulley 33 fixed on the end of shaft 17 by means of a belt 34 and a motor not shown in the drawing.

It has been stated supra that one of the objects of my invention is to take full advantage of the centrifugal effects which are present in a cyclone separator but which, without further means, would not produce separation of magnetic materials from non-magnetic materials. In the conventional cyclone separator, of course, the solid materials tend to be thrown toward the outside wall of the chamber and, following deceleration by friction with the walls, the solid materials fall to the bottom of the cylindrical portion of the chamber and thence into a conical bottom section 36 which collects them and supplies them to a gravity-feed outlet pipe 37. Now, assuming that magnetic materials such as iron or steel particles are generally more dense than the fluffy carbon black in combustion products, the magnetic materials will tend to be thrown closer to the side walls of the chamber than are the particles of non-magnetic materials such as carbon black. Although a certain degree of separation of magnetic materials from non-magnetic materials is thus obtained in an ordinary cyclone device, no advantage has been taken, prior to my invention, of that degree of separation, and the magnetic materials and non-magnetic materials have been allowed to fall together again in the hopper, thus wasting the separation produced by the centrifugal action. Now, in the device of my invention, the particles of magnetic materials, being generally more dense than the non-magnetic materials, are thrown toward the outside wall of the chamber but, instead of being allowed to fall into the common mass in the conical bottom section 36, are caught and held by the vertical cylindrical surface of the drum 14. It is clear that removal of magnetic materials from the mass of non-magnetic materials can more efficiently be done at this point, where some degree of separation has already been achieved, than at some later point in the manufacturing process where the magnetic and non-magnetic materials have again become confused. Moreover, the device of my invention does not simply perform in one step what was formerly performed in two steps; higher efficiency of separation is obtained by my device which employs simultaneous magnetic and mechanical forces to achieve separation than was obtained by prior-art devices which in effect separated the materials by means of one force, mixed-up the materials again, and finally attempted at a later stage to re-separate the materials by using another force. The device according to my invention employs both forces at once to separate the magnetic materials from the non-magnetic materials under the most favorable separation conditions and, most important of all, the device according to my invention keeps the two classes of materials separate rather than letting them become confused in the conical bottom section of the cyclone.

Returning to the structure of the collection system for the magnetic materials, it will be apparent that member 14 should be set at such a height in the chamber wall that substantially all the magnetic materials entering the chamber from inlet pipe 11 will strike the vertical cylindrical portion of member 14. More specifically, the height of member 14 should be chosen upon the basis of knowledge as to the velocity with which magnetic materials will enter the chamber; the trajectory of the magnetic materials issuing from inlet pipe 11 should be such that, following deflection and deceleration by the wall of the chamber, they will have fallen to the level of member 14. Moreover, the amount of extension of member 14 into the chamber should not be so great as to cause excessive turbulence in the flow of materials within the chamber, nor should member 14 extend so far into the chamber as to cause any great accumulation of material on top of end plate 15. Incidentally, end plate 15 should be closely spaced to the chamber wall to prevent substantial leakage of material therebetween.

When magnetic material has become attached to the vertical cylindrical portion of member 14, rotation of member 14 carries it out through the chamber wall and into an auxiliary housing 40 which contains a brush 41 or other means for removing the magnetic materials from member 14. Such a brush may be fixed or, if desired, may be made to rotate by any suitable power means. If member 14 and brush 41 are forced to rotate in the same direction, either clockwise or counter-clockwise, the respective portions thereof in contact with each other will be traveling in opposite directions, and the cleaning action will be maximized. It would be possible in certain cases to mount brush 41 for rotation on a shaft, and to supply the shaft with a pulley which could be driven by belt 34. As the magnetic material is dislodged from the surface of member 14 by brush 41 or by equivalent means, the magnetic material falls into an outlet pipe 45. The outlet pipe 45 may be of any desired configuration and should be located beneath the brush 41 so that magnetic material dislodged by the brush 41 is led away. As for the non-magnetic material, which has been assumed to be principally carbon black in the case under discussion, it falls into conical bottom section 36 as in a prior-art cyclone separator, and is led away by outlet pipe 37. The gaseous constituents of the combustion products are forced by the pressure of further incoming combustion products to flow up into a vent pipe 50 whence the gases are led away by an outlet pipe 51.

It will be seen that I have shown and described a satisfactory device for separating magnetic materials from non-magnetic materials in a way which is far more efficient than those which are practiced by prior-art devices. While I have used for purposes of illustration a separating device designed to be employed in the production of carbon black, it will be understood that my invention has applications in many processes where magnetic materials are to be separated from non-magnetic materials, whether they be respectively iron and carbon black or some other mixture of two or more materials. Whatever the application may be, the device of my invention completes the separation at a stage where the materials are already partly separated, instead of allowing them to become confused again. In the carbon black industry, in particular, the separation is performed at a stage when the carbon black is still light and fluffy and before it has become packed, thereby trapping the magnetic material and making the two classes of materials harder to separate. Finally, two types of forces are simultaneously employed in order to effect the separation, thereby achieving maximum efficiency with a minimum amount of apparatus.

It will be understood that means for preventing leakage of gases past the magnet-cyclone seal may be provided by sealing the open space from the outside with a fiber or cloth friction bag or strip; the pressure of the sealing strip being so adjusted that effective sealing is accomplished without brushing off the magnetic particles.

While the embodiment which has been shown in the drawings and described in the foregoing specification is presently the most favored embodiment of my invention, it will be obvious that the number, nature and arrangement of the elements may be considerably varied to satisfy different environmental and performance requirements without departing from the essence of my invention.

Having thus disclosed my invention and described in detail an illustrative embodiment thereof, I claim as new and desire to secure by Letters Patent:

1. A device for separating from one another a magnetic material, a non-magnetic material, and a fluid, said device comprising these elements, a hopper; means for leading into said hopper a mixture of magnetic material, non-magnetic material, and fluid; means for circulating said mixture within said hopper, magnetic means in the side wall of said hopper for attracting said magnetic material, means for removing said magnetic material from said magnetic means, means for collecting said magnetic material, means in the lower portion of said hopper for leading away said non-magnetic material, and means in the upper portion of said hopper for leading away said fluid.

2. A device according to claim 1 in which said magnetic means is rotatable.

3. A device according to claim 1 in which said magnetic means is a substantially cylindrical rotatable body.

4. A device according to claim 1 in which said means for removing said magnetic material from said magnetic means is a brush.

5. A device for separating from one another a magnetic material, a non-magnetic material, and a fluid, said device comprising the following elements: a hopper; pipe means for leading into said hopper a stream including magnetic material, non-magnetic material, and a fluid; rotary magnetic means in the side wall of said hopper for attracting said magnetic material; brush means for removing said magnetic material from said rotary magnetic means; pipe means for collecting and leading away the magnetic material removed from said rotary magnetic means by said brush means; pipe means for leading away said non-magnetic material from the bottom of said hopper; and pipe means having a terminus within said hopper for leading away said fluid from said hopper.

6. A device according to claim 5 in which said stream is deflected within said hopper to throw said magnetic material against said rotary magnetic means.

7. A device for separating from one another a magnetic material, a non-magnetic material, and a fluid, comprising a hopper; means for directing into said hopper a mixture of said magnetic material, said non-magnetic material and said fluid; a magnetic member disposed in the side wall of said hopper, said magnetic member being located at a height relative to that of said directing means determined by the trajectory of said magnetic materials within said hopper to intercept said magnetic materials; means for removing magnetic material accumulated by said magnetic member; means in the lower portion of said hopper for leading away said non-magnetic material; and means in the upper portion of said hopper for leading away said fluid.

8. A device as defined in claim 7 including means for rotating said magnetic member about an axis substantially parallel to that of said hopper.

9. Apparatus for separating magnetic grit from carbon black entrained in gaseous combustion products, comprising a hopper, means for directing at a predetermined velocity a gas borne mixture of said magnetic grit and carbon black into said hopper at a point adjacent the top thereof, a rotatable cylindrical magnetic drum disposed in the side wall of said hopper at a point determined by the trajectory within the hopper of the magnetic grit to intercept the said grit, means for rotating said drum, a frictional contact device disposed externally of the hopper for dislodging magnetic grit accumulated by the drum in its rotation, an outlet duct for the gaseous component of the mixture disposed concentrically within the hopper, and means at the bottom of the hopper for the discharge of the separated carbon black.

References Cited in the file of this patent

UNITED STATES PATENTS

| 1,051,758 | Preslar | Jan. 28, 1913 |
| 1,056,318 | Bruck | Mar. 18, 1913 |

FOREIGN PATENTS

| 263,878 | Germany | Sept. 12, 1913 |